US012676300B2

(12) United States Patent
Ikejiri et al.

(10) Patent No.: US 12,676,300 B2
(45) Date of Patent: Jul. 7, 2026

(54) ELECTRODE MIX FOR SECONDARY BATTERY, ELECTRODE FOR ALL-SOLID-STATE SECONDARY BATTERY, AND ALL-SOLID-STATE SECONDARY BATTERY

(71) Applicant: NIPPON ELECTRIC GLASS CO., LTD., Otsu (JP)

(72) Inventors: Junichi Ikejiri, Otsu (JP); Hideo Yamauchi, Otsu (JP); Shigeya Aoki, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 18/861,622

(22) PCT Filed: May 30, 2023

(86) PCT No.: PCT/JP2023/020102
§ 371 (c)(1),
(2) Date: Oct. 30, 2024

(87) PCT Pub. No.: WO2023/234296
PCT Pub. Date: Dec. 7, 2023

(65) Prior Publication Data
US 2025/0309241 A1 Oct. 2, 2025

(30) Foreign Application Priority Data

Jun. 2, 2022 (JP) ................................. 2022-090180

(51) Int. Cl.
*H01B 1/08* (2006.01)
*C01B 25/45* (2006.01)
(Continued)

(52) U.S. Cl.
CPC ............. *H01M 4/364* (2013.01); *C01B 25/45* (2013.01); *H01B 1/08* (2013.01); *H01M 4/5825* (2013.01);
(Continued)

(58) Field of Classification Search
CPC ........... H01B 1/00; H01B 1/08; H01M 4/364; H01M 4/62; H01M 4/625
See application file for complete search history.

(56) References Cited

U.S. PATENT DOCUMENTS

| | | | |
|---|---|---|---|
| 8,859,670 B2 | 10/2014 | Schuessler et al. | |
| 10,270,135 B2 * | 4/2019 | Yamasaki | ......... H01M 10/0562 |

(Continued)

FOREIGN PATENT DOCUMENTS

| | | |
|---|---|---|
| CN | 116210101 A | 6/2023 |
| JP | 2011134550 A | 7/2011 |

(Continued)

OTHER PUBLICATIONS

English language machine translation of form PCT/ISA/237 (mailed Aug. 22, 2022).*

(Continued)

*Primary Examiner* — Mark Kopec
(74) *Attorney, Agent, or Firm* — Keating & Bennett, LLP

(57) ABSTRACT

Provided is an electrode composite material for a secondary battery that can satisfy both the electronic conductivity and the ionic conductivity at a high level and thus effectively increase the battery characteristics. An electrode composite material for a secondary battery contains a positive-electrode active material and a conductive agent, the positive-electrode active material containing: (i) at least one transition metal element selected from the group consisting of Cr, Fe, Mn, Co, Ni, Ti, and Nb; (ii) at least one element selected from the group consisting of P, Si, and B; and (iii) an element (Continued)

consisting of O, the conductive agent containing a fibrous carbon.

13 Claims, 2 Drawing Sheets

(51) Int. Cl.

| | |
|---|---|
| *H01M 4/36* | (2006.01) |
| *H01M 4/58* | (2010.01) |
| *H01M 4/62* | (2006.01) |
| *H01M 10/054* | (2010.01) |

(52) U.S. Cl.
CPC ............. *H01M 4/62* (2013.01); *H01M 4/625* (2013.01); *H01M 10/054* (2013.01); *C01P 2006/40* (2013.01)

(56) References Cited

U.S. PATENT DOCUMENTS

| | | | | |
|---|---|---|---|---|
| 11,018,374 | B2 * | 5/2021 | Mizutani | H01M 4/364 |
| 11,088,367 | B2 * | 8/2021 | Kosaka | H01M 4/58 |
| 11,522,175 | B2 * | 12/2022 | Komura | H01M 4/1391 |
| 12,119,479 | B2 * | 10/2024 | Fujiki | H01M 4/134 |
| 12,142,729 | B2 * | 11/2024 | He | H01M 10/058 |
| 2012/0258359 | A1 | 10/2012 | Saka | |
| 2017/0346094 | A1 * | 11/2017 | Yamauchi | |
| 2019/0372102 | A1 * | 12/2019 | Miki | H01M 4/525 |
| 2020/0112050 | A1 | 4/2020 | Hu et al. | |
| 2020/0373559 | A1 | 11/2020 | Baek et al. | |
| 2021/0313559 | A1 | 10/2021 | Zettsu et al. | |
| 2022/0271335 | A1 * | 8/2022 | Jang | H01M 4/139 |
| 2023/0369564 | A1 | 11/2023 | Sakamoto et al. | |
| 2025/0183357 | A1 | 6/2025 | Hu et al. | |

FOREIGN PATENT DOCUMENTS

| | | | | |
|---|---|---|---|---|
| JP | 2015026483 | A | | 2/2015 |
| JP | 2020517049 | A | | 6/2020 |
| JP | 2021508162 | A | | 2/2021 |
| JP | 2022018845 | A | | 1/2022 |
| KR | 20180131448 | A | * | 12/2018 |
| WO | 2016084573 | A1 | | 6/2016 |
| WO | 2020105729 | A1 | | 5/2020 |
| WO | 2022070777 | A1 | | 4/2022 |

OTHER PUBLICATIONS

Longoni et al "The Na2FeP2O7-carbon nanotubes composite as high rate cathode material for sodium ion batteries", Journal of Power Sources 302 (2016) 61-69.*

Priyadarshini et al "Electrochemical studies on Na2FeP2O7 pyrophosphate enhanced with SWCNT as intercalation compounds for Na-ion batteries: An insight into sensitive mode operations", Materials Letters 284 (2021) 128949.*

International Search Report in PCT/JP2023/020102, mailed Aug. 22, 2023, 2 pages.

Written Opinion in PCT/JP2023/020102, mailed Aug. 22, 2023, 4 pages, (No English translation).

Official Communication issued in corresponding European Patent Application No. 23816053.5, mailed on Apr. 17, 2026, 10 pages.

Yamauchi et al., "Enhanced rate capabilities in a glass-ceramic-derived sodium all-solid-state battery", Scientific Reports vol. 10, No. 1, Jun. 11, 2020, 11 pages.

Pennell et al., "Specific Surface Area: Methods of Soil Analysis: Part 4 Physical Methods", Soil Science Society of America, Jan. 1, 2002, pp. 295-314.

\* cited by examiner

[FIG. 1]
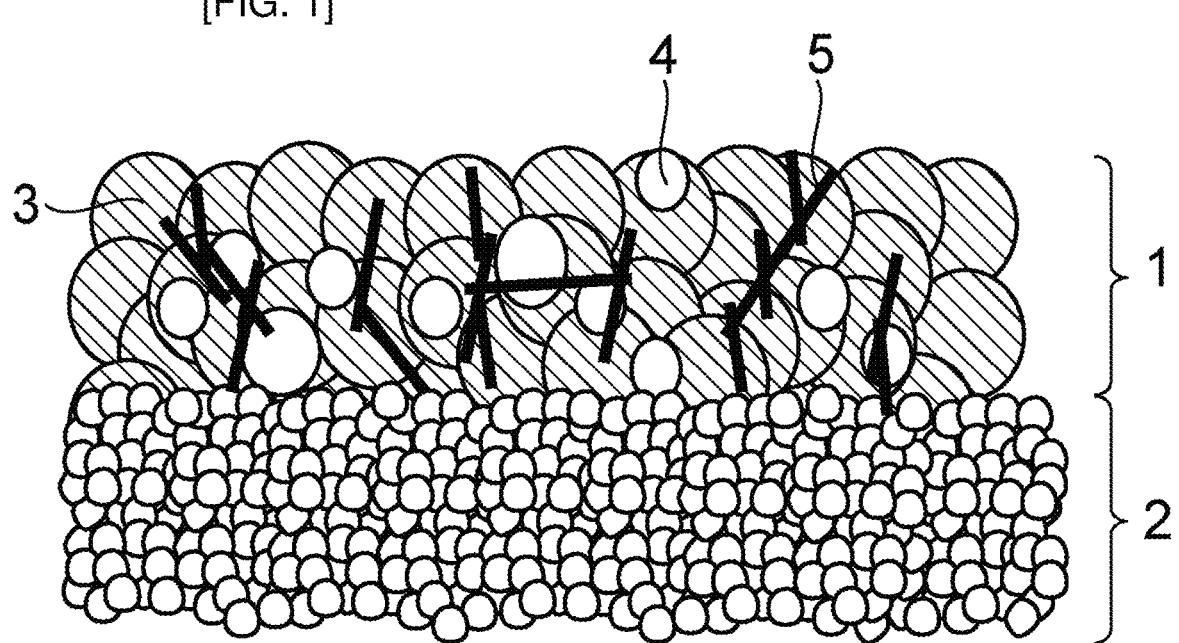

[FIG. 2]
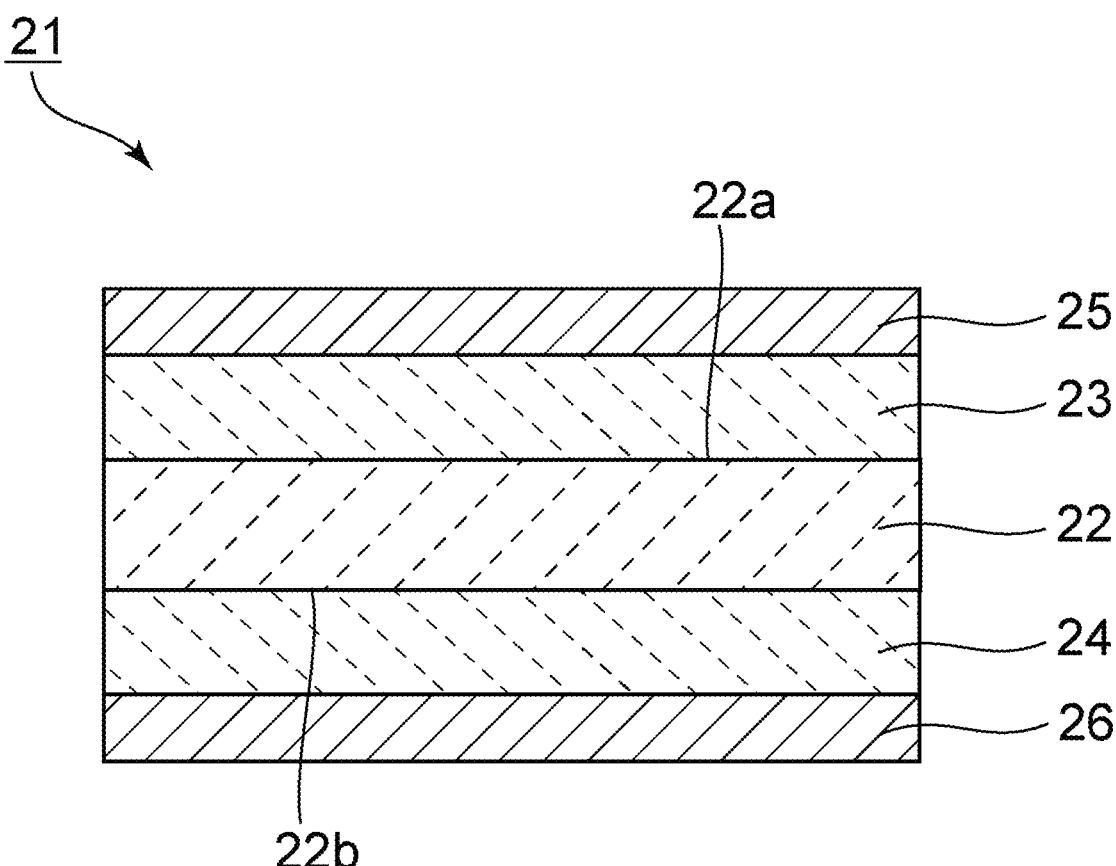
[FIG. 3]
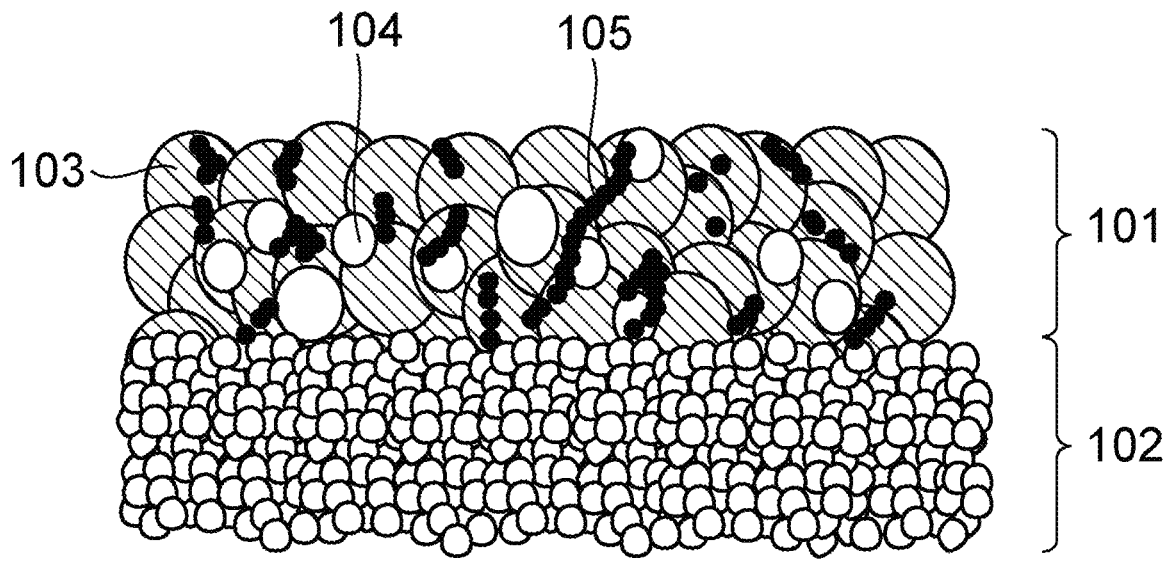

ELECTRODE MIX FOR SECONDARY BATTERY, ELECTRODE FOR ALL-SOLID-STATE SECONDARY BATTERY, AND ALL-SOLID-STATE SECONDARY BATTERY

TECHNICAL FIELD

The present invention relates to electrode composite materials for secondary batteries, electrodes for all-solid-state secondary batteries in which the electrode composite materials for secondary batteries are used, and all-solid-state secondary batteries in which the electrodes for all-solid-state secondary batteries are used.

BACKGROUND ART

Lithium-ion secondary batteries have secured their place as high-capacity and light-weight power sources essential for mobile devices, electric vehicles, and so on. However, current lithium-ion secondary batteries employ as their electrolytes, mainly, combustible organic electrolytic solutions, which raises concerns about the risk of burning or explosion. As a solution to this problem, all-solid-state lithium-ion batteries using a solid electrolyte instead of an organic electrolytic solution have been under development. Furthermore, because, as for lithium, there are concerns about such issues as global rise in raw and processed material costs, all-solid-state sodium-ion secondary batteries have also been under development.

Patent Literature 1 below discloses a positive-electrode material for a power storage device containing: a positive-electrode active material represented by $Na_x(Fe_{1-a}M_a)_yP_2O_z$ (where M represents at least one transition metal element selected from the group consisting of Cr, Mn, Co, and Ni, $1.2 \leq x \leq 2.8$, $0.95 \leq y \leq 1.6$, $0 \leq a \leq 0.9$, and $7 \leq z \leq 8$); a sodium-ion conductive solid electrolyte; and a conductive carbon. Patent Literature 1 describes that acetylene black, which has a high electronic conductivity, is preferred as the conductive carbon.

CITATION LIST

Patent Literature

[PTL 1]
WO2016/084573

SUMMARY OF INVENTION

Technical Problem

However, even the positive-electrode material for a power storage device disclosed in Patent Literature 1 has difficulty in satisfying both the electronic conductivity and the ionic conductivity at a high level and has a problem of difficulty in increasing the battery characteristics more sufficiently.

An object of the present invention is to provide: an electrode composite material for a secondary battery that can satisfy both the electronic conductivity and the ionic conductivity at a high level and thus effectively increase the battery characteristics; an electrode for an all-solid-state secondary battery in which the electrode composite material for a secondary battery is used; and an all-solid-state secondary battery in which the electrode for an all-solid-state secondary battery is used.

Solution to Problem

A description will be given of aspects of an electrode composite material for a secondary battery, an electrode for an all-solid-state secondary battery, and an all-solid-state secondary battery, each of which can solve the above problem.

An electrode composite material for a secondary battery of aspect 1 in the present invention contains a positive-electrode active material and a conductive agent, the positive-electrode active material containing: (i) at least one transition metal element selected from the group consisting of Cr, Fe, Mn, Co, Ni, Ti, and Nb; (ii) at least one element selected from the group consisting of P, Si, and B; and (iii) an element consisting of O, the conductive agent containing a fibrous carbon.

An electrode composite material for a secondary battery of aspect 2 is the electrode composite material for a secondary battery according to aspect 1, wherein the conductive agent preferably consists of the fibrous carbon.

An electrode composite material for a secondary battery of aspect 3 is the electrode composite material for a secondary battery according to aspect 1 or 2, wherein the fibrous carbon preferably contains carbon nanotubes.

An electrode composite material for a secondary battery of aspect 4 is the electrode composite material for a secondary battery according to any one of aspects 1 to 3, wherein the fibrous carbon preferably consists of carbon nanotubes.

An electrode composite material for a secondary battery of aspect 5 is the electrode composite material for a secondary battery according to any one of aspects 1 to 4, wherein the electrode composite material preferably further contains a solid electrolyte.

An electrode composite material for a secondary battery of aspect 6 is the electrode composite material for a secondary battery according to any one of aspects 1 to 5, wherein the positive-electrode active material preferably contains crystals represented by a general formula $A_xMC_yO_z$ (where A is at least one selected from the group consisting of Li and Na, M is at least one selected from the group consisting of Cr, Fe, Mn, Co and Ni, C is at least one selected from the group consisting of P, Si, and B, $0.2 \leq x \leq 4.2$, $0.65 \leq y \leq 6.5$, and $2.5 \leq z \leq 20$).

An electrode composite material for a secondary battery of aspect 7 is the electrode composite material for a secondary battery according to any one of aspects 1 to 6, wherein the positive-electrode active material preferably further contains Na.

An electrode composite material for a secondary battery of aspect 8 is the electrode composite material for a secondary battery according to any one of aspects 5 to 7, wherein the solid electrolyte preferably contains β-alumina, β-alumina or NASICON crystals.

An electrode composite material for a secondary battery of aspect 9 is the electrode composite material for a secondary battery according to any one of aspects 1 to 8, wherein the electrode composite material for a secondary battery preferably contains, in terms of % by mass, 30% to 98% the positive-electrode active material, 0.1% to 65% solid electrolyte, and 0.1% to 3% the conductive agent.

An electrode composite material for a secondary battery of aspect 10 is the electrode composite material for a secondary battery according to any one of aspects 1 to 9, wherein a ratio of a content of the conductive agent to a content of the positive-electrode active material (conductive agent/positive-electrode active material) is preferably not less than 0.001 and not more than 0.05 in terms of mass ratio.

An electrode composite material for a secondary battery of aspect 11 is the electrode composite material for a secondary battery according to any one of aspects 1 to 10, wherein a ratio of a surface area of the conductive agent to a surface area of the positive-electrode active material (conductive agent/positive-electrode active material) is preferably not less than 0.01 and not more than 0.5.

An electrode composite material for a secondary battery of aspect 12 is the electrode composite material for a secondary battery according to any one of aspects 1 to 11, wherein the electrode composite material for a secondary battery is preferably for use in a sodium-ion secondary battery.

An electrode composite material for a secondary battery of aspect 13 is the electrode composite material for a secondary battery according to any one of aspects 1 to 12, wherein the electrode composite material for a secondary battery is preferably for use in an all-solid-state sodium-ion secondary battery.

An electrode for an all-solid-state secondary battery of aspect 14 in the present invention contains the electrode composite material for a secondary battery according to any one of aspects 1 to 13.

An all-solid-state secondary battery of aspect 15 in the present invention includes as a positive electrode the electrode for an all-solid-state secondary battery according to aspect 14.

Advantageous Effects of Invention

The present invention enables provision of: an electrode composite material for a secondary battery that can satisfy both the electronic conductivity and the ionic conductivity at a high level and thus effectively increase the battery characteristics; an electrode for an all-solid-state secondary battery in which the electrode composite material for a secondary battery is used; and an all-solid-state secondary battery in which the electrode for an all-solid-state secondary battery is used.

BRIEF DESCRIPTION OF DRAWINGS

FIG. 1 is a schematic cross-sectional view showing a solid electrolyte layer and an electrode layer formed on the solid electrolyte layer, each according to an embodiment of the present invention.

FIG. 2 is a schematic cross-sectional view showing an all-solid-state secondary battery according to an embodiment of the present invention.

FIG. 3 is a schematic cross-sectional view showing a solid electrolyte layer and an electrode layer formed on the solid electrolyte layer, each according to a conventional art.

DESCRIPTION OF EMBODIMENTS

Hereinafter, a description will be given of preferred embodiments. However, the following embodiments are merely illustrative and the present invention is not intended to be limited to the following embodiments. Throughout the drawings, members having substantially the same functions may be referred to by the same reference characters. [Electrode Composite Material for Secondary Battery]

An electrode composite material for a secondary battery of the present invention contains a positive-electrode active material and a conductive agent. The electrode composite material for a secondary battery of the present invention may further contain a solid electrolyte. The positive-electrode active material contains: (i) at least one transition metal element selected from the group consisting of Cr, Fe, Mn, Co, Ni, Ti, and Nb; (ii) at least one element selected from the group consisting of P, Si, and B; and (iii) an element consisting of O. The conductive agent contains a fibrous carbon.

The electrode composite material for a secondary battery of the present invention has the above structure. Therefore, even when a positive-electrode active material having a very low electronic conductivity is used as an electrode for a secondary battery, both the electronic conductivity and the ionic conductivity can be satisfied at a high level and, thus, the battery characteristics can be effectively increased. This point can be explained as follows with reference to FIGS. 1 and 3.

FIG. 1 is a schematic cross-sectional view showing a solid electrolyte layer 2 and an electrode layer 1 formed on the solid electrolyte layer 2, each according to an embodiment of the present invention. The electrode layer 1 is made of an electrode composite material for a secondary battery containing: a positive-electrode active material 3; a solid electrolyte 4; and a conductive agent 5. The conductive agent 5 contains a fibrous carbon. The conductive agent 5 preferably consists of a fibrous carbon. The solid electrolyte layer 2 contains mainly a solid electrolyte.

FIG. 3 is a schematic cross-sectional view showing a solid electrolyte layer and an electrode layer formed on the solid electrolyte layer, each according to a conventional art. The electrode layer 101 is made of an electrode composite material for a secondary battery containing: a positive-electrode active material 103; a solid electrolyte 104; and a conductive agent 105 consisting of acetylene black.

Active materials for use in electrodes for all-solid-state secondary batteries are generally not sufficient in electronic conductivity and ionic conductivity. Therefore, in addition to an active material, a solid electrolyte and a conductive agent are used in an electrode for an all-solid-state secondary battery. However, if the amount of conductive agent added is increased in order to increase the electronic conductivity, the conductive agent may inhibit ionic conduction to decrease the ionic conductivity. Therefore, the conventional all-solid-state secondary batteries have a problem of difficulty in satisfying both the electronic conductivity and the ionic conductivity at a high level.

Furthermore, if, with the use of a positive-electrode active material like that used in the present invention, the content of conductive agent in an electrode layer is large, the surface of a positive-electrode active material precursor powder is covered with the conductive agent during sintering of the positive-electrode active material precursor powder, resulting in decreased sinterability. Particularly in forming a thicker electrode layer, the sinterability is more likely to decrease, which also presents a problem of difficulty in increasing the thickness of the electrode layer.

To cope with the above problems, as shown in FIG. 1, the electrode layer 1 made of the electrode composite material for a secondary battery of the present invention includes the conductive agent 5 containing a fibrous carbon. Therefore, the electrode layer 1 made of the electrode composite material for a secondary battery of the present invention can easily secure an electron-conducting path compared to the electrode layer 101 where approximately spherical acetylene black particles are used as shown in FIG. 3. Thus, the electrode layer 1 made of the electrode composite material for a secondary battery of the present invention can develop a high electronic conductivity even when the amount of conductive agent 5 added is small. Hence, the electrode layer 1 made of the electrode composite material for a secondary battery of the present invention enables the addition of conductive agent 5 to be reduced to a small amount, which makes it less likely that the inhibition of ionic conduction due to the conductive agent occurs and makes it possible to increase the ionic conductivity while securing a high electronic conductivity. These effects can be enhanced when the conductive agent consists of a fibrous carbon.

Moreover, since the electrode composite material for a secondary battery of the present invention enables the addition of the conductive agent 5 to be reduced to a small amount, it is less likely that, even with the use of the positive-electrode active material of the present invention in the electrode composite material, the sinterability of the precursor of the positive-electrode active material during sintering thereof decreases, leading to deterioration in battery characteristics. In addition, since during sintering of the precursor of the positive-electrode active material the sinterability thereof is less likely to decrease, the electrode layer 1 can be increased in thickness and, thus, the charge and discharge capacities of a resultant secondary battery can be increased.

Hence, with the use of the electrode composite material for a secondary battery of the present invention, both the electronic conductivity and the ionic conductivity can be satisfied at a high level and the battery characteristics can be effectively increased.

The electrode composite material for a secondary battery of the present invention preferably contains, in terms of % by mass, 30% to 98% positive-electrode active material, 0.1% to 65% solid electrolyte, and 0.1% to 3% conductive agent. In this case, both the electronic conductivity and the ionic conductivity can be satisfied at an even higher level and the battery characteristics can be effectively increased.

In the present invention, the content of the positive-electrode active material in the electrode composite material for a secondary battery is, in terms of % by mass, preferably not less than 30%, more preferably not less than 50%, even more preferably not less than 70%, preferably not more than 98%, and more preferably not more than 95%. When the content of the positive-electrode active material in the electrode composite material for a secondary battery is within the above range, the battery characteristics, such as the charge and discharge capacities, of the secondary battery can be more effectively increased.

In the present invention, the content of the solid electrolyte in the electrode composite material for a secondary battery is, in terms of % by mass, preferably not less than 0.1%, more preferably not less than 5%, even more preferably not less than 8%, preferably not more than 65%, more preferably not more than 40%, even more preferably not more than 30%, and particularly preferably not more than 20%. When the content of the solid electrolyte in the electrode composite material for a secondary battery is within the above range, the ionic conductivity can be further increased and, thus, the battery characteristics can be more effectively increased.

In the present invention, the content of the conductive agent in the electrode composite material for a secondary battery is, in terms of % by mass, preferably not less than 0.1%, more preferably not less than 0.2%, even more preferably not less than 0.3%, particularly preferably not less than 0.4%, most preferably not less than 0.5%, preferably not more than 3%, more preferably not more than 2%, even more preferably not more than 1%, yet even more preferably not more than 0.9%, particularly preferably not more than 0.8%, and most preferably not more than 0.7%. When the conductive agent in the electrode composite material for a secondary battery contains a fibrous carbon and the content of the conductive agent is within the above range, the ionic conductivity can be further increased while a high electronic conductivity is secured and, thus, the battery characteristics can be more effectively increased.

In the present invention, the ratio of the content of the conductive agent to the content of the positive-electrode active material (conductive agent/positive-electrode active material) is, in terms of mass ratio, preferably not less than 0.001, more preferably not less than 0.002, even more preferably not less than 0.003, particularly preferably not less than 0.004, most preferably not less than 0.005, preferably not more than 0.05, more preferably not more than 0.03, even more preferably not more than 0.02, yet even more preferably not more than 0.01, particularly preferably not more than 0.009, and most preferably not more than 0.007. When the conductive agent in the electrode composite material for a secondary battery contains a fibrous carbon and the above content ratio (conductive agent/positive-electrode active material) is within the above range, the ionic conductivity can be further increased while a high electronic conductivity is secured and, thus, the battery characteristics can be more effectively increased.

The above content ratio (conductive agent/positive-electrode active material) can be determined by dividing the content (% by mass) of the conductive agent in the electrode composite material for a secondary battery by the content (% by mass) of the positive-electrode active material in the electrode composite material for a secondary battery.

In the present invention, the ratio of the surface area of the conductive agent to the surface area of the positive-electrode active material (conductive agent/positive-electrode active material) is preferably not less than 0.01, more preferably not less than 0.02, even more preferably not less than 0.03, particularly preferably not less than 0.04, most preferably not less than 0.05, preferably not more than 0.5, more preferably not more than 0.3, even more preferably not more than 0.2, yet even more preferably not more than 0.1, particularly preferably not more than 0.09, and most preferably not more than 0.07. When the conductive agent in the electrode composite material for a secondary battery contains a fibrous carbon and the above surface area ratio (conductive agent/positive-electrode active material) is within the above range, the ionic conductivity can be further increased while a high electronic conductivity is secured and, thus, the battery characteristics can be more effectively increased.

The above surface area ratio (conductive agent/positive-electrode active material) can be determined by the following formula (1).

$$\text{Surface Area Ratio}=(A1{\times}A2)/(B1{\times}B2) \qquad \text{formula(1)}$$

In the formula (1), A1 represents the content (% by mass) of the conductive agent in the electrode composite material for a secondary battery. A2 represents the BET specific surface area (m²/g) of the conductive agent. B1 represents the content (% by mass) of the positive-electrode active material in the electrode composite material for a secondary battery. B2 represents the BET specific surface area (m²/g) of the positive-electrode active material. The BET specific surface areas of the conductive agent and the positive-electrode active material can be measured by the BET multipoint method using nitrogen as an adsorbate.

The electrode composite material for a secondary battery of the present invention is preferably used in a sodium-ion secondary battery and more preferably used in an all-solid-state sodium-ion secondary battery.

Hereinafter, a description will be given of specific examples of materials constituting the electrode composite material for a secondary battery of the present invention.

(Positive-Electrode Active Material)

The positive-electrode active material contains: (i) at least one transition metal element selected from the group consisting of Cr, Fe, Mn, Co, Ni, Ti, and Nb; (ii) at least one element selected from the group consisting of P, Si, and B; and (iii) an element consisting of O.

In the present invention, the positive-electrode active material preferably contains crystals represented by a general formula $A_xMC_yO_z$ (where A is at least one selected from the group consisting of Li and Na, M is at least one selected from the group consisting of Cr, Fe, Mn, Co and Ni, C is at least one selected from the group consisting of P, Si, and B, $0.2 \leq x \leq 4.2$, $0.65 \leq y \leq 6.5$, and $2.5 \leq z \leq 20$), and more preferably contains crystals represented by a general formula $A_xMC_yO_z$ (where A is at least one selected from the group consisting of Li and Na, M is at least one selected from the group consisting of Cr, Fe, Mn, and Co, C is at least one selected from the group consisting of P, Si, and B, $0.2 \leq x \leq 4.2$, $0.65 \leq y \leq 6.5$, and $2.5 \leq z \leq 20$).

Furthermore, the positive-electrode active material is preferably a positive-electrode active material consisting of a crystallized glass containing crystals represented by a general formula $Na_xM_yP_2O_z$ (where $1 \leq x \leq 2.8$, $0.95 \leq y \leq 1.6$, $6.5 \leq z \leq 8$, and M represents at least one selected from the group consisting of Cr, Fe, Mn, Co and Ni). Particularly, the positive-electrode active material is more preferably a positive-electrode active material consisting of a crystallized glass containing crystals represented by a general formula $Na_xMP_2O_7$ (where $1 \leq x \leq 2$ and M represents at least one selected from the group consisting of Cr, Fe, Mn, Co and Ni).

Examples that can be used as the above crystals contained in the positive-electrode active material include $Na_2FeP_2O_7$, $Na_2CoP_2O_7$, and $Na_2NiP_2O_7$.

In the present disclosure, the crystallized glass means a glass obtained by heating (firing) a precursor glass containing an amorphous phase to precipitate crystals (crystallization). The entire amorphous phase may transition to a crystalline phase or part of the amorphous phase may remain. Furthermore, a single type of crystals may be precipitated or two or more types of crystals may be precipitated. For example, whether the glass is a crystallized glass or not can be determined by the peak angles and peak intensities shown by powder X-ray diffraction (XRD).

(Solid Electrolyte)

The solid electrolyte is a component that plays a role in conducting ions through an electrode layer in an all-solid-state secondary battery. When the electrode composite material for a secondary battery contains a solid electrolyte, the ionic conductivity thereof can be increased without an electrolytic solution.

Examples of the solid electrolyte include beta-alumina and NASICON crystals, both of which have excellent sodium-ion conductivity. Beta-alumina includes two types of crystals: β-alumina (theoretical composition formula: $Na_2O \cdot 11Al_2O_3$) and β"-alumina (theoretical composition formula: $Na_2O \cdot 5.3Al_2O_3$). β"-alumina is a metastable material into which, generally, $Li_2O$ or MgO is added as a stabilizing agent. β"-alumina has a higher sodium-ion conductivity than β-alumina. Therefore, β"-alumina alone or a mixture of β"-alumina and β-alumina is preferably used and $Li_2O$-stabilized β"-alumina ($Na_{1.7}Li_{0.3}Al_{10.7}O_{17}$) or MgO-stabilized β"-alumina (($Al_{10.32}Mg_{0.68}O_{16}$) ($Na_{1.68}O$)) is more preferably used.

Examples of the NASICON crystal include $Na_3Zr_2Si_2PO_{12}$, $Na_{3.2}Zr_{1.3}Si_{2.2}P_{0.7}O_{10.5}$, $Na_3Zr_{1.6}T_{10.4}Si_2PO_{12}$, $Na_3Hf_2Si_2PO_{12}$, $Na_{3.4}Zr_{0.9}Hf_{10.4}Al_{0.6}Si_{1.2}P_{1.8}O_{12}$, $Na_3Zr_{1.7}Nb_{0.24}Si_2PO_{12}$, $Na_{3.6}Ti_{0.2}Y_{0.7}Si_{2.8}O_9$, $Na_3Zr_{1.88}Y_{0.12}Si_2PO_{12}$, $Na_{3.12}Zr_{1.88}Y_{0.12}Si_2PO_{12}$, and $Na_{3.6}Zr_{0.13}Yb_{1.67}Si_{0.11}P_{2.9}O_{12}$. Among them, $Na_{3.12}Zr_{1.88}Y_{0.12}Si_2PO_{12}$ is particularly preferred as NASICON crystals because it has excellent sodium-ion conductivity.

(Conductive Agent)

The conductive agent is a component that forms a conducting path in an electrode layer. In the present invention, the conductive agent contains a fibrous carbon. Thus, even when the amount of conductive agent is small, the electrode composite material for a secondary battery can easily satisfy both a high electronic conductivity and a high ionic conductivity. The conductive agent preferably consists of a fibrous carbon. Examples of the fibrous carbon include carbon nanotubes, carbon nanofibers, and carbon fibers. Above all, the fibrous carbon preferably contains carbon nanotubes and more preferably consists of carbon nanotubes. Even more preferably, the conductive agent consists of carbon nanotubes.

The BET specific surface area of the carbon nanotubes is preferably not less than 50 $m^2$/g, more preferably not less than 100 $m^2$/g, and even more preferably not less than 150 $m^2$/g. The upper limit of the BET specific surface area of the carbon nanotubes is not particularly limited, but is preferably not more than 2000 $m^2$/g, more preferably not more than 1500 $m^2$/g, and even more preferably not more than 1000 $m^2$/g. When the BET specific surface area of the carbon nanotubes is within the above range, the electronic conductivity of the electrode composite material for a secondary battery can be further increased at a smaller amount of carbon nanotubes added. The BET specific surface area of the carbon nanotubes can be measured by the BET multi-point method using nitrogen as an adsorbate.

The length of the carbon nanotubes is preferably not less than 0.5 μm, more preferably not less than 1 μm, even more preferably not less than 3 μm, preferably not more than 50 μm, more preferably not more than 40 μm, and even more preferably not more than 30 μm. The diameter of the carbon nanotubes is preferably not less than 1 nm, more preferably not less than 3 nm, preferably not more than 30 nm, and more preferably not more than 20 nm. When the length and diameter of the carbon nanotubes are within the above respective ranges, the electronic conductivity of the electrode composite material for a secondary battery can be further increased at a smaller amount of carbon nanotubes added.

The length and diameter of the carbon nanotubes can be determined, for example, by measuring the lengths and diameters of 200 carbon nanotubes with a scanning electron microscope or others and calculating the respective averages of the measured lengths and diameters.

[Electrode for All-Solid-State Secondary Battery and All-Solid-State Secondary Battery]

FIG. 2 is a schematic cross-sectional view showing an all-solid-state secondary battery according to an embodiment of the present invention. As shown in FIG. 2, an all-solid-state secondary battery 21 includes a solid electrolyte layer 22, a positive electrode layer (an electrode layer)

23, a negative electrode layer 24, a first current collector layer 25, and a second current collector layer 26. In this embodiment, the all-solid-state secondary battery is an all-solid-state sodium-ion secondary battery.

The solid electrolyte layer 22 has a first principal surface 22a and a second principal surface 22b opposed to each other. The positive electrode layer 23 is provided on the first principal surface 22a of the solid electrolyte layer 22. The first current collector layer 25 is provided on a principal surface of the positive electrode layer 23 located on the side thereof opposite to the solid electrolyte layer 22. Furthermore, the negative electrode layer 24 is provided on the second principal surface 22b of the solid electrolyte layer 22. The second current collector layer 26 is provided on a principal surface of the negative electrode layer 24 located on the side thereof opposite to the solid electrolyte layer 22. The first current collector layer 25 and the second current collector layer 26 may not necessarily be provided. The electrode for an all-solid-state secondary battery of the present invention refers to, for example, the positive electrode layer 23.

Hereinafter, a description will be given of the details of each layer of the all-solid-state secondary battery of the present invention.

(Positive Electrode Layer)

The positive electrode layer is made of the above-described electrode composite material for a secondary battery of the present invention. The electrode composite material for a secondary battery can be formed, for example, by forming on a principal surface of a solid electrolyte layer an electrode material layer containing a positive-electrode active material precursor, a conductive agent, and, as necessary, powder of a sodium-ion conductive solid electrolyte and firing the electrode material layer. The electrode material layer can be obtained, for example, by applying a paste containing a positive-electrode active material precursor, a conductive agent, and, as necessary, powder of a solid electrolyte and drying the paste. The paste may contain, as necessary, a binder, a plasticizer, a solvent, and/or so on. The electrode material layer may be a powder compact.

The drying temperature of the paste is not particularly limited, but it may be, for example, not lower than 30° C. and not higher than 150° C. The drying time of the paste is not particularly limited, but it may be, for example, not less than 5 minutes and not more than 600 minutes.

The atmosphere during the firing is preferably an inert atmosphere or a reductive atmosphere. The firing temperature (the highest temperature thereof) may be, for example, 400° C. to 800° C. and the holding time at the temperature may be, for example, five minutes to less than three hours.

Positive-Electrode Active Material Precursor;

The positive-electrode active material precursor (positive-electrode active material precursor powder) is preferably made of an amorphous oxide material that generates active material crystals when fired. In the case where the positive-electrode active material precursor powder is made of an amorphous oxide material, when the amorphous oxide material is fired, it not only generates active material crystals, but also can be softened and fluidified to form a dense positive electrode layer. In addition, the positive-electrode active material and the solid electrolyte can be integrated together. Alternatively, in the case where the positive electrode layer contacts the solid electrolyte layer, both the layers can be bonded together. As a result, an ion-conducting path is formed better, which is favorable. In the present invention, the term "amorphous oxide material" is not limited to a fully amorphous oxide material and includes those partially containing crystals (for example, those having a crystallinity of 10% or less).

The positive-electrode active material precursor powder preferably contains, in terms of % by mole of the following oxides, 10% to 55% $Na_2O$, 10% to 50% $Fe_2O_3 + Cr_2O_3 + MnO + CoO + NiO$, and 15% to 70% $P_2O_5$. The reasons why the composition is limited as just described will be described below. In the following description of the respective contents of the components, "%" refers to "% by mole" unless otherwise stated.

$Na_2O$ is a main component of the active material crystals represented by a general formula $Na_xM_yP_2O_z$ (where M represents at least one transition metal element selected from the group consisting of Cr, Fe, Mn, Co and Ni, $1 < x \leq 2.8$, $0.95 \leq y \leq 1.6$, and $6.5 \leq z \leq 8$). The content of $Na_2O$ is preferably 10% to 55%, more preferably 15% to 50%, and even more preferably 30% to 50%. When the content of $Na_2O$ is within the above range, the charge and discharge capacities can be further increased.

$Fe_2O_3$, $Cr_2O_3$, MnO, CoO, and NiO are also main components of the active material crystals represented by the general formula $Na_xM_yP_2O_z$. The content of $Fe_2O_3 + Cr_2O_3 + MnO + CoO + NiO$ is preferably 10% to 50%, more preferably 15% to 30%, and even more preferably 15% to 25%. When the content of $Fe_2O_3 + Cr_2O_3 + MnO + CoO + NiO$ is the above lower limit or more, the charge and discharge capacities can be further increased. On the other hand, when the content of $Fe_2O_3 + Cr_2O_3 + MnO + CoO + NiO$ is the above upper limit or less, this can make it less likely that undesirable crystals, such as $Fe_2O_3$, $Cr_2O_3$, MnO, CoO or NiO, precipitate. In order to further increase the cycle characteristics, $Fe_2O_3$ is preferably positively contained in the positive-electrode active material precursor powder. The content of $Fe_2O_3$ is preferably 1% to 50%, more preferably 5% to 40%, even more preferably 10% to 30%, and particularly preferably 15% to 25%. The content of each component of $Cr_2O_3$, MnO, CoO, and NiO is preferably 0% to 30%, more preferably 10% to 30%, and even more preferably 15% to 25%. In containing at least two components selected from the group consisting of $Fe_2O_3$, $Cr_2O_3$, MnO, CoO, and NiO in the positive-electrode active material precursor powder, the total content of them is preferably 10% to 50%, more preferably 10% to 30%, and even more preferably 15% to 25%.

$P_2O_5$ is also a main component of the active material crystals represented by the general formula $Na_xM_yP_2O_z$. The content of $P_2O_5$ is preferably 15% to 70%, more preferably 25% to 55%, and even more preferably 30% to 50%. When the content of $P_2O_5$ is within the above range, the charge and discharge capacities can be further increased.

The positive-electrode active material precursor powder may contain, in addition to the above components, $V_2O_5$, $Nb_2O_5$, MgO, $Al_2O_3$, $TiO_2$, $ZrO_2$ or $Sc_2O_3$. These components have the effect of increasing the conductivity (electronic conductivity), which facilitates the enhancement of the rapid charge and discharge characteristics. The total content of these components is preferably 0% to 25% and more preferably 0.2% to 10%. When the content of these components is the above upper limit or less, heterogeneous crystals not contributing to the battery characteristics are less likely to be generated and, thus, the charge and discharge capacities can be further increased.

Aside from the above components, the positive-electrode active material precursor powder may contain $SiO_2$, B203, $GeO_2$, $Ga_2O_3$, $Sb_2O_3$ or $Bi_2O_3$. When containing any of these components, a positive-electrode active material precursor powder having an increased glass formation ability and being more homogeneous is easy to obtain. The total content of these components is preferably 0% to 37% and more preferably 0.2% to 25%. Because these components do not contribute to the battery characteristics, an excessively large content of them leads to a tendency to decrease the charge and discharge capacities.

The positive-electrode active material precursor powder is preferably made by melting a raw material batch and forming the melt into a shape. This method is preferred because an amorphous positive-electrode active material precursor powder having excellent homogeneity can be easily obtained. Specifically, the positive-electrode active material precursor powder can be produced in the following manner.

First, raw materials are formulated to give a desired composition, thus obtaining a raw material batch. Next, the obtained raw material batch is melted. The melting temperature may be appropriately adjusted to make the raw material batch homogeneously melted. For example, the melting temperature is preferably 800° C. or higher and more preferably 900° C. or higher. The upper limit of the melting temperature is not particularly limited, but an excessively high melting temperature leads to energy loss or evaporation of the sodium component and so on. Therefore, the melting temperature is preferably not higher than 1500° C. and more preferably not higher than 1400° C.

Next, the obtained melt is formed into a shape. The method for forming the melt into a shape is not particularly limited. For example, the melt may be formed into a film with rapid cooling by pouring the melt between a pair of cooling rolls or may be formed into an ingot by casting the melt into a mold.

Subsequently, the obtained formed body is ground to obtain a positive-electrode active material precursor powder. The average particle diameter of the positive-electrode active material precursor powder is preferably not less than 0.01 μm and less than 5 μm, more preferably not less than 0.03 μm and not more than 3 μm, even more preferably not less than 0.03 μm and not more than 2 μm, particularly preferably not less than 0.03 μm and not more than 1 μm, and most preferably not less than 0.03 μm and not more than 0.7 μm.

In the present invention, the average particle diameter means D50 (a volume-based average particle diameter) and refers to a value measured by the laser diffraction/scattering method.

Solid Electrolyte Powder;

For example, the above-described solid electrolyte is ground to obtain a solid electrolyte powder. The average particle diameter of the solid electrolyte powder is preferably not less than 0.01 μm and not more than 3 μm, more preferably not less than 0.03 μm and less than 1.8 μm, even more preferably not less than 0.03 μm and not more than 1.5 μm, particularly preferably not less than 0.03 μm and not more than 1.2 μm, and most preferably not less than 0.03 μm and not more than 0.7 μm. If the average particle diameter of the solid electrolyte powder is too small, the solid electrolyte powder not only becomes difficult to uniformly mix together with the active material precursor powder, but also may absorb moisture or become carbonated to decrease the ionic conductivity or may promote an excessive reaction with the active material precursor powder. As a result, the internal resistance of the electrode material layer increases and, thus, the voltage characteristics and the charge and discharge capacities tend to decrease. On the other hand, if the average particle diameter of the solid electrolyte powder is too large, this significantly inhibits the softening and flow of the active material precursor powder and, therefore, the resultant electrode layer tends to have poor smoothness to decrease the mechanical strength and tends to increase the internal resistance.

Binder;

The binder is a material for binding the component materials (component material powders) together. Examples of the binder include: cellulose derivatives, such as carboxymethyl cellulose, hydroxypropylmethyl cellulose, hydroxypropyl cellulose, ethyl cellulose, hydroxyethyl cellulose, and hydroxymethyl cellulose, or water-soluble polymers, such as polyvinyl alcohol; thermosetting resins, such as thermosetting polyimide, phenolic resin, epoxy resin, urea resin, melamine resin, unsaturated polyester resin, and polyurethane; polycarbonate-based resins, such as polypropylene carbonate; and polyvinylidene fluoride.

The thickness of the positive electrode layer is preferably 10 μm or more, more preferably 30 μm or more, even more preferably 50 μm or more, particularly preferably 70 μm or more, and most preferably 100 μm or more. In this case, the charge and discharge capacities of the all-solid-state secondary battery can be further increased. However, if the thickness of the positive electrode layer is too large, not only the resistance to electron conduction becomes high to make it likely that the discharge capacity and the operating voltage decrease, but also the stress due to contraction during firing becomes large to make it likely that peel-off occurs. Therefore, the thickness of the positive electrode layer is preferably not more than 1000 μm.

The amount of positive-electrode active material supported in the positive electrode layer is preferably 1 mg/cm² or more, more preferably 3 mg/cm² or more, even more preferably 5 mg/cm² or more, particularly preferably 7 mg/cm² or more, and most preferably 10 mg/cm² or more. In this case, the charge and discharge capacities of the all-solid-state secondary battery can be further increased. The upper limit of the amount of positive-electrode active material supported is not particularly limited, but it may be, for example, 500 mg/cm².

(Solid Electrolyte Layer)

The solid electrolyte layer can be made by mixing raw material powders (solid electrolyte powder), forming the mixed raw material powders (solid electrolyte powder) into a shape, and then firing it. For example, the solid electrolyte layer can be made by making a slurry of the raw material powders (solid electrolyte powder), making a green sheet from the slurry, and then firing the green sheet. Alternatively, the solid electrolyte layer may be made by the sol-gel method.

The average particle diameter of the solid electrolyte powder is preferably not less than 0.01 μm and not more than 3 μm, more preferably not less than 0.03 μm and less than 1.8 μm, even more preferably not less than 0.03 μm and not more than 1.5 μm, particularly preferably not less than 0.03 μm and not more than 1.2 μm, and most preferably not less than 0.03 μm and not more than 0.7 μm. If the average particle diameter of the solid electrolyte powder is too small, the solid electrolyte powder may absorb moisture or become carbonated to decrease the ionic conductivity. As a result, the internal resistance of the electrode material layer increases and, thus, the voltage characteristics and the charge and discharge capacities tend to decrease. On the other hand, if the average particle diameter of the solid electrolyte powder is too large, this tends to increase the internal resistance.

The thickness of the solid electrolyte layer is preferably in a range of 5 μm to 1000 μm and more preferably in a range of 10 μm to 200 μm. If the thickness of the solid electrolyte layer is too small, the mechanical strength decreases and, thus, the solid electrolyte layer is liable to breakage. Therefore, an internal short circuit is likely to develop. If the thickness of the solid electrolyte layer is too large, the distance of sodium-ion conduction accompanying charge and discharge becomes long and the internal resistance therefore becomes high, which makes it likely that the discharge capacity and the operating voltage decrease. In addition, the energy density per unit volume of the all-solid-state secondary battery is also likely to decrease.

(Negative Electrode Layer)

The negative-electrode active material contained in the negative electrode layer is not particularly limited, but, for example, a carbon electrode material, such as hard carbon or soft carbon, can be used as the negative-electrode active material. The carbon electrode material is preferably hard carbon. However, the negative-electrode active material may contain a negative-electrode active material based on an alloy of tin, bismuth, lead or phosphorus or like alloy capable of absorbing and releasing sodium or metallic sodium. The negative electrode layer is preferably not a negative electrode layer formed of a single phase of metallic sodium.

The negative electrode layer may further contain a sodium-ion conductive solid electrolyte and/or a conductive agent. The ratio among components in the negative electrode layer may be, for example, in terms of % by mass, 60% to 95% negative-electrode active material, 5% to 35% sodium-ion conductive solid electrolyte, and 0% to 5% conductive agent. Examples of the sodium-ion conductive solid electrolyte that can be used include those described in the section of the solid electrolyte layer. Examples of the conductive agent that can be used include those described in the section of the positive electrode layer.

The thickness of the negative electrode layer is preferably in a range of 0.3 μm to 500 μm and more preferably in a range of 3 μm to 300 μm. If the thickness of the negative electrode layer is too small, the absolute capacity (mAh/g) of the negative electrode tends to decrease. If the thickness of the negative electrode layer is too large, the resistance becomes high and, therefore, the capacity (mAh/g) tends to decrease.

The negative electrode layer can be produced, for example, using a slurry containing a negative-electrode active material precursor powder and, as necessary, a solid electrolyte powder and/or a conductive agent. As necessary, a binder, a plasticizer, a solvent, and/or so on are added to the slurry. The negative electrode layer can be produced by applying the slurry onto a principal surface of the solid electrolyte layer, drying it, and then firing it. Alternatively, the negative electrode layer may be produced by applying the slurry onto a base material made of PET (polyethylene terephthalate) or so on, drying the slurry to make a green sheet, and then firing the green sheet. Still alternatively, the negative electrode layer may be made of metal, in which case the negative electrode layer can be formed by sputtering, vapor evaporation or the like.

(First Current Collector Layer and Second Current Collector Layer)

The material for the first current collector layer and the second current collector layer is not particularly limited, but metallic materials, such as aluminum, titanium, silver, copper, stainless steel or an alloy of any of them, can be used for each of the layers. These metallic materials may be used singly or in combination of two or more of them. The alloy of any of them means an alloy containing at least one of the above metals. The thickness of each of the first current collector layer and the second current collector layer is not particularly limited, but may be in a range of 0.01 μm to 1000 μm.

The method for forming the first current collector layer and the second current collector layer is not particularly limited and examples include physical vapor deposition methods, such as evaporation coating and sputtering, and chemical vapor deposition methods, such as thermal CVD, MOCVD, and plasma CVD. Other methods for forming the first current collector layer and the second current collector layer include liquid-phase deposition methods, such as plating, the sol-gel method, and spin coating. However, the first current collector layer and the second current collector layer are preferably formed on the positive electrode layer and the negative electrode layer, respectively, by sputtering because excellent adhesion is provided.

Although the description in the above embodiment has been given of an all-solid-state sodium-ion secondary battery in which a material having sodium-ion conductivity is used, the electrode composite material for a secondary battery of the present invention may be used for any other all-solid-state secondary battery, such as an all-solid-state lithium-ion secondary battery in which a material having lithium-ion conductivity is used.

Hereinafter, the present invention will be described in more detail with reference to specific examples. The present invention is not at all limited to the following examples and can be embodied in appropriately modified forms without changing the gist of the invention.

Example 1 (Ex. 1)

(a) Production of Solid Electrolyte Layer

Raw materials were mixed to give a composition of β"-alumina as a solid electrolyte, pre-fired at 1250° C., and ground. The raw materials after being pre-fired, a binder, a plasticizer, a dispersant, a solvent, and so on were mixed to prepare a paste. A green sheet was formed from the paste and fired at 1550° C. for 30 minutes, thus forming a 36 mm square, 450 μm thick solid electrolyte layer.

(b) Production of Positive-Electrode Paste

Raw materials formulated to provide, in terms of molar ratio, $40Na_2O-20Fe_2O_3-40P_2O_5$ as a glass composition were melt at 1250° C. for 45 minutes in the atmosphere and the melt was formed into a shape by cooled twin rollers, thus producing a glass film. The obtained glass film was ground in a ball mill and a planetary ball mill to obtain a positive-electrode active material precursor powder (a glass powder) having an average particle diameter D50 of 0.2 μm and a BET specific surface area of 30 $m^2/g$.

An amount of 86.5% by mass of glass powder obtained as above, 12.9% by mass of β"-alumina (with a specific surface area of 45 $m^2/g$) as a solid electrolyte, and 0.6% by mass of carbon nanotubes (stock number "LB116" manufactured by Cnano Technology Co., Ltd., BET specific surface area: 300 $m^2/g$, diameter: 10 nm, length: 20 μm) as a conductive agent were mixed, thus producing a positive electrode composite material powder. An amount of 20% by mass of polypropylene carbonate (PPC) as a binder was further added to 100% by mass of positive electrode composite material powder obtained as above and N-methyl-2-pyrrolidone was further added as a solvent to give the positive electrode composite material powder a concentration of 50% by mass. These materials were mixed with a planetary centrifugal mixer, thus producing a positive-electrode paste.

(c) Production of Negative-Electrode Paste

Sucrose being a carbon electrode material precursor and serving as a source of hard carbon and β-alumina powder were mixed for an hour in a stirrer to give a weight ratio of 4:1, thus obtaining a mixture. Next, the mixture was dried for 12 hours in a thermostat bath at 60° C. and then vacuum dried at 100° C. for six hours, thus obtaining a powder mixture of the sodium-ion conductive solid electrolyte precursor and the carbon electrode material precursor. Next, the powder mixture was ground into powdered form in an agate mortar.

The powder mixture of the sodium-ion conductive solid electrolyte precursor and the carbon electrode material precursor, hard carbon powder (with an average particle diameter $D_{50}$ of 1 μm), and a conductive agent (acetylene black) were weighed to give a weight ratio of 57:40:3 and mixed, thus obtaining a mixed powder. An amount of 15% by mass of polypropylene carbonate (PPC) as a binder was further added to 100% by mass of the negative electrode composite material powder and N-methyl-2-pyrrolidone was further added as a solvent to give the negative electrode composite material powder a concentration of 50% by mass. These materials were mixed with a planetary centrifugal mixer, thus producing a negative-electrode paste.

(d) Formation of Negative Electrode

The negative-electrode paste was applied as a coating to a central portion of one principal surface of the 36 mm square, 450 mm thick solid electrolyte layer to have a thickness of 70 μm and a size of 33 mm square. The paste coating was dried for an hour in a thermostat bath at 80° C. Thereafter, the coating was fired under conditions of 800° C. for two hours in an $N_2$ (99.99%) atmosphere, thus forming a negative electrode. The weight of the negative electrode supported was determined from (the weight of a laminate after the formation of the negative electrode) minus (the weight of the solid electrolyte layer). The determined weight of the negative electrode supported was multiplied by 0.8, which is a ratio of active material in the negative electrode, thus calculating the weight of hard carbon active material. Furthermore, the capacity of the negative electrode was calculated by estimating the capacity per g of the hard carbon at 300 mAh/g. As a result, the capacity of the negative electrode was 4.4 mAh.

(e) Formation of Positive Electrode

The positive-electrode paste was applied as a coating to a central portion of the principal surface of the solid electrolyte layer on the side opposite to the negative electrode to have a thickness of 300 μm and a size of 33 mm square. The paste coating was dried for two hours in a thermostat bath at 80° C. and then fired under conditions of holding at 500° C. for 30 minutes in an $N_2/H_2$ (96/4 in % by volume terms) atmosphere, thus forming an electrode composite material (a positive electrode) for a secondary battery. The weight of the positive electrode supported was determined from (the weight of a laminate after the formation of the positive electrode) minus (the weight of the laminate before the formation of the positive electrode). The determined weight of the positive electrode supported was multiplied by 0.865, which is a ratio of active material ($Na_2FeP_2O_7$ active material obtained as above) in the positive electrode, thus calculating the weight of $Na_2FeP_2O_7$ active material. The capacity of the positive electrode was calculated by estimating the capacity per g of the $Na_2FeP_2O_7$ crystallized glass (the $Na_2FeP_2O_7$ active material) at a theoretical capacity of 97 mAh/g. As a result, the capacity of the positive electrode was 11 mAh. Furthermore, the capacity of the negative electrode was divided by the capacity of the positive electrode, thus determining the N/P ratio (Negative Electrode Capacity/Positive Electrode Capacity). The N/P ratio was 0.4.

(f) Formation of Current Collector and Assembly of Coin Cell

A 100 nm thick aluminum-deposited film was formed as a current collector on the entire surface of the positive electrode or the negative electrode. Thereafter, the laminate was encapsulated into a CR2032 coin cell in an argon glove box, thus producing an all-solid-state cell.

Examples 2 to 9 (Ex. 2-9) and Comparative Examples 1 to 2 (CEx. 1-2)

All-solid-state secondary cells were made in the same manner as in Example 1 except that the composition of the electrode composite material for a secondary battery was adjusted to respective compositions as described in Table 1 below. In Comparative Examples 1 and 2, acetylene black (stock number "SUPER P" manufactured by TIMCAL, BET specific surface area: 62 $m^2/g$) was used as a conductive agent.

Evaluations

The produced cells were measured in terms of battery characteristics by charging and discharging each of the cells under conditions of 60° C. and a C-rate of 0.02 and determining its initial discharge capacity (hereinafter, referred to as a discharge capacity) and initial charge-discharge efficiency (hereinafter, referred to as a charge-discharge efficiency). The results are shown in Table 1 below.

TABLE 1

| | | Ex. 1 | Ex. 2 | Ex. 3 | Ex. 4 | Ex. 5 | Ex. 6 |
|---|---|---|---|---|---|---|---|
| Composition of Electrode Composite Material (Positive Electrode) [% by mass] | Positive-electrode active material | 86.5 | 86.8 | 86.7 | 86.6 | 86.4 | 86.3 |
| | Solid electrolyte | 12.9 | 12.9 | 12.9 | 12.9 | 12.9 | 12.8 |
| | Conductive agent: carbon nanotubes | 0.6 | 0.3 | 0.4 | 0.5 | 0.7 | 0.9 |
| | Conductive agent: acetylene black | — | — | — | — | — | — |
| Content Ratio (Conductive agent/Positive-electrode active material) Mass Ratio | | 0.0069 | 0.0035 | 0.0046 | 0.0058 | 0.0081 | 0.0104 |
| Surface Area Ratio (Conductive agent/Positive-electrode active material) | | 0.069 | 0.035 | 0.046 | 0.058 | 0.081 | 0.104 |
| Cell Thickness [μm] | | 520 | 520 | 520 | 520 | 520 | 520 |
| Discharge Capacity [mAh/g] | | 81.2 | 71.2 | 75.4 | 78.6 | 78.8 | 76.3 |

TABLE 1-continued

| | | | | | | |
|---|---|---|---|---|---|
| Initial Charge-Discharge Efficiency [%] | 81.8 | 77.2 | 79.1 | 80.3 | 81.2 | 80.2 |
| Weight of Electrode (Positive Electrode)Composite Material [mg/cm²] | 12 | 12 | 12 | 12 | 12 | 12 |
| Energy Density [mAh/cm³] | 1.62 | 1.43 | 1.51 | 1.57 | 1.57 | 1.52 |

| | | Ex. 7 | Ex. 8 | Ex. 9 | CEx. 1 | CEx. 2 |
|---|---|---|---|---|---|---|
| Composition of Electrode Composite Material (Positive Electrode) [% by mass] | Positive-electrode active material | 86.2 | 85.9 | 85.7 | 83.4 | 86.5 |
| | Solid electrolyte | 12.8 | 12.8 | 12.8 | 12.4 | 12.9 |
| | Conductive agent: carbon nanotubes | 1.1 | 1.3 | 1.5 | — | — |
| | Conductive agent: acetylene black | — | — | — | 4.2 | 0.6 |
| Content Ratio (Conductive agent/Positive-electrode active material) Mass Ratio | | 0.0128 | 0.0151 | 0.0175 | 0.0504 | 0.0069 |
| Surface Area Ratio (Conductive agent/Positive-electrode active material) | | 0.128 | 0.151 | 0.175 | 0.104 | 0.014 |
| Cell Thickness [μm] | | 520 | 520 | 520 | 520 | 520 |
| Discharge Capacity [mAh/g] | | 74.4 | 72.8 | 72.2 | 66.2 | 10.3 |
| Initial Charge-Discharge Efficiency [%] | | 78.8 | 78.0 | 77.4 | 76.8 | 68.4 |
| Weight of Electrode (Positive Electrode)Composite Material [mg/cm²] | | 12 | 12 | 12 | 12 | 12 |
| Energy Density [mAh/cm³] | | 1.48 | 1.44 | 1.43 | 1.27 | 0.21 |

As seen from the above, when the content of carbon nanotubes was in a range of 0.3% by mass to 1.5% by mass (in Examples 1 to 9), the discharge capacity was as high as 71.2 mAh/g or more and the initial charge-discharge efficiency was as high as 77.2% or more. Particularly, when the content of carbon nanotubes was in a range of 0.4% by mass to 0.9% by mass (in Examples 1 and 3 to 6), the discharge capacity was 75.4 mAh/g or more higher than the above and the initial charge-discharge efficiency was 79.1% or more higher than the above. On the other hand, in Comparative Example 1 where acetylene black was used as a conductive agent, the discharge capacity was 66.2 mAh/g and the initial charge-discharge efficiency was 76.8%. In Comparative Example 2 where acetylene black was used as a conductive agent, the discharge capacity was 10.3 mAh/g and the initial charge-discharge efficiency was 68.4%.

REFERENCE SIGNS LIST

1 . . . electrode layer
2 . . . solid electrolyte layer
3 . . . positive-electrode active material
4 . . . solid electrolyte
5 . . . conductive agent
21 . . . all-solid-state secondary battery
22 . . . solid electrolyte layer
22a, 22b . . . first and second principal surfaces
23 . . . positive electrode layer
24 . . . negative electrode layer
25, 26 . . . first and second current collector layers

The invention claimed is:

1. An electrode composite material for a secondary battery, the electrode composite material comprising:
a positive-electrode active material and a conductive agent, wherein
the positive-electrode active material contains: (i) at least one transition metal element selected from the group consisting of Cr, Fe, Mn, Co, Ni, Ti, and Nb; (ii) at least one element selected from the group consisting of P, Si, and B; and (iii) an element consisting of O,
the conductive agent containing a fibrous carbon, and
a ratio of a surface area of the conductive agent to a surface area of the positive-electrode active material (conductive agent/positive-electrode active material) is not less than 0.01 and not more than 0.5.

2. The electrode composite material for a secondary battery according to claim 1, wherein the conductive agent consists of the fibrous carbon.

3. The electrode composite material for a secondary battery according to claim 1, wherein the fibrous carbon contains carbon nanotubes.

4. The electrode composite material for a secondary battery according to claim 1, wherein the fibrous carbon consists of carbon nanotubes.

5. The electrode composite material for a secondary battery according to claim 1, wherein the positive-electrode active material contains crystals represented by a general formula $A_xMC_yO_z$ (where A is at least one selected from the group consisting of Li and Na, M is at least one selected from the group consisting of Cr, Fe, Mn, Co and Ni, C is at least one selected from the group consisting of P, Si, and B, $0.2 \le x \le 4.2$, $0.65 \le y \le 6.5$, and $2.5 \le z \le 20$).

6. The electrode composite material for a secondary battery according to claim 1, wherein the positive-electrode active material further contains Na.

7. The electrode composite material for a secondary battery according to claim 1, wherein said composite material further comprises a solid electrolyte, and, wherein the solid electrolyte contains β-alumina, β"-alumina or NASICON crystals.

8. The electrode composite material for a secondary battery according to claim 7, containing, in terms of % by mass, 30% to 98% the positive-electrode active material, 0.1% to 65% solid electrolyte, and 0.1% to 3% the conductive agent.

9. The electrode composite material for a secondary battery according to claim 1, wherein a ratio of a content of the conductive agent to a content of the positive-electrode active material (conductive agent/positive-electrode active material) is not less than 0.001 and not more than 0.05 in terms of mass ratio.

10. The electrode composite material for a secondary battery according to claim 1, the electrode composite material being for use in a sodium-ion secondary battery.

11. The electrode composite material for a secondary battery according to claim 1, the electrode composite material being for use in an all-solid-state sodium-ion secondary battery.

12. An electrode for an all-solid-state secondary battery, the electrode containing the electrode composite material for a secondary battery according to claim 1.

13. An all-solid-state secondary battery comprising as a positive electrode the electrode for an all-solid-state secondary battery according to claim 12.

* * * * *